United States Patent
Bolomier et al.

[11] Patent Number: 5,824,228
[45] Date of Patent: Oct. 20, 1998

[54] METHOD AND DEVICE FOR REMOVAL, WITHIN A CLOSED REACTOR, OF THE PHASE OF THE LOWEST DENSITY FROM A BIPHASE SYSTEM WITH PRESENCE OF INTERFACE

[75] Inventors: Denis Bolomier, Chaponost; Maurice Bailloud, Saint Gents Laval; Pascal Dubost, Villars les Dombes, all of France

[73] Assignee: Rhone-Poulenc Chimie, Courbevoie Cedex, France

[21] Appl. No.: 714,131

[22] PCT Filed: Mar. 16, 1995

[86] PCT No.: PCT/FR95/00316

§ 371 Date: Jan. 22, 1997

§ 102(e) Date: Jan. 22, 1997

[87] PCT Pub. No.: WO95/24957

PCT Pub. Date: Sep. 21, 1995

[30] Foreign Application Priority Data

Mar. 16, 1994 [FR] France .................................. 94 03306

[51] Int. Cl.⁶ .................................................. B01D 17/12
[52] U.S. Cl. .............................. 210/740; 210/86; 210/97; 210/744; 210/800
[58] Field of Search .................................. 210/85, 86, 94, 210/96.1, 143, 513, 515, 744, 745, 800, 97, 136, 740, 776; 436/150

[56] References Cited

U.S. PATENT DOCUMENTS

| | | | |
|---|---|---|---|
| 4,487,836 | 12/1984 | Takayanagi et al. | 436/150 |
| 4,711,716 | 12/1987 | Calltharp et al. | 210/136 |
| 4,904,396 | 2/1990 | Benet | 210/745 |
| 4,927,545 | 5/1990 | Roginski | 210/85 |
| 4,962,041 | 10/1990 | Roginski | 436/150 |
| 5,130,030 | 7/1992 | Lloyd | 210/744 |
| 5,358,644 | 10/1994 | Dennis | 210/744 |
| 5,415,784 | 5/1995 | Akutsu et al. | 210/86 |
| 5,421,995 | 6/1995 | Norcross | 210/86 |

*Primary Examiner*—Joseph W. Drodge
*Attorney, Agent, or Firm*—Burns, Doane, Swecker & Mathis, L.L.P.

[57] ABSTRACT

A method and apparatus for removal of a phase from a biphase system having an interface between the phases includes a sensor for sensing a level of the phase of highest density arranged beneath and at a distance from the plane of the suction port of a tube and a device for guiding and moving the tube and the sensor with respect to the reservoir, in a reciprocal, rectilinear path parallel to an axis of the tube.

11 Claims, 3 Drawing Sheets

METHOD AND DEVICE FOR REMOVAL, WITHIN A CLOSED REACTOR, OF THE PHASE OF THE LOWEST DENSITY FROM A BIPHASE SYSTEM WITH PRESENCE OF INTERFACE

TECHNICAL DOMAIN

The present invention relates to the technical domain of the separation of phases of various products and more particularly liquids, intervening in all industrial processes and it concerns more particularly the step of separation having to occur from a reservoir or closed reactor containing a biphase system with the presence of interface between at least two products, compounds or media having different densities.

In numerous industrial processes, it is necessary to separate one phase with respect to another and, to that end, one technique consists in employing an immersion tube adapted on the cover or top of the reactor, so as to plunge in the inner volume to allow removal, by suction, of the phase presenting the lowest density.

This technique which effectively makes it possible to withdraw, extract or remove the phase of lowest density is generally satisfactory but its use is limited in a certain number of applications.

When the process of separation takes place in a closed and non-transparent reservoir, the difficulty in implementing the above means consists in being able to assess relatively precisely the plane of separation of the phases, so as to be able to dispose the suction port of the immersion tube just slightly above this plane.

It might be considered that such a plane may be assessed with a sufficient precision from the operational parameters of the industrial process and/or from the quantities of basic products to be treated giving rise to the biphase system.

In practice, this is not the case and the uncertainty concerning the assessment of the plane of separation of the phases blind raises a serious problem when the cost of the method for obtaining and that of the compound having to be extracted should be taken into account.

In fact, the uncertainty may lead to leaving as a precaution a large proportion of the phase to be removed inside the reactor, or to removing a part of the phase of higher density, which leads to a pollution of the extraction lines, but also of the phase of lowest density of which it was desired to produce and remove the most pure possible quantity.

These drawbacks are increased further when the level of the plane of separation of the phases is subjected to unforeseeable fluctuations which are difficult to control, due for example either to the conditions of development of a process upstream of the reactor or to the variations in the parameters governing the inner medium of the reactor, such as those of temperature and pressure.

PRIOR ART

It may be considered that the prior art does not provide, at the present time, technical means ensuring removal, within a closed reactor, of a compound of lower density with respect to a medium of higher density, supplying blind a certainty of maximum extraction of the compound of lowest density without any removal of the medium of highest density.

The object of the invention is to respond to the need thus manifested, by proposing a novel method of removal wherein, in a blind volume, the plane of the level of separation between at least two phases, of which only the upper one must be removed from the closed reactor, is taken into account.

DESCRIPTION OF THE INVENTION

To attain the object set forth hereinabove, the invention proposes a method of removal, characterized in that it consists in:

arranging, substantially in the plane of the port of the tube, a detector of interface between two phases of different density, of the medium of highest density, displacing the tube via guiding and motorization means in a reciprocal rectilinear path parallel to the axis of the tube until said interface is detected by the detector, and sucking the phase of lowest density until the suction means are deenergized.

The invention also has for its object a removal device enabling the above object to be attained, such a device for removal within a closed phase separation reactor, of the type comprising a suction head adapted on the top of the reactor and connected to suction means and an immersion tube descending in the reactor and presenting at its lower end a suction port, being characterized in that it comprises:

a sensor of level of the phase of highest density, arranged beneath and at a distance from the plane of the suction port and connected to a data-processing means located outside the reactor, and means for guiding and moving the tube with respect to the reactor, in a reciprocal rectilinear path parallel to the axis of the tube.

Various other characteristics will appear from the description given hereinbelow with respect to the accompanying drawings, which show, by way of non-limiting examples, embodiments of the object of the invention.

PREFERRED EMBODIMENT OF THE INVENTION

Figure 1:
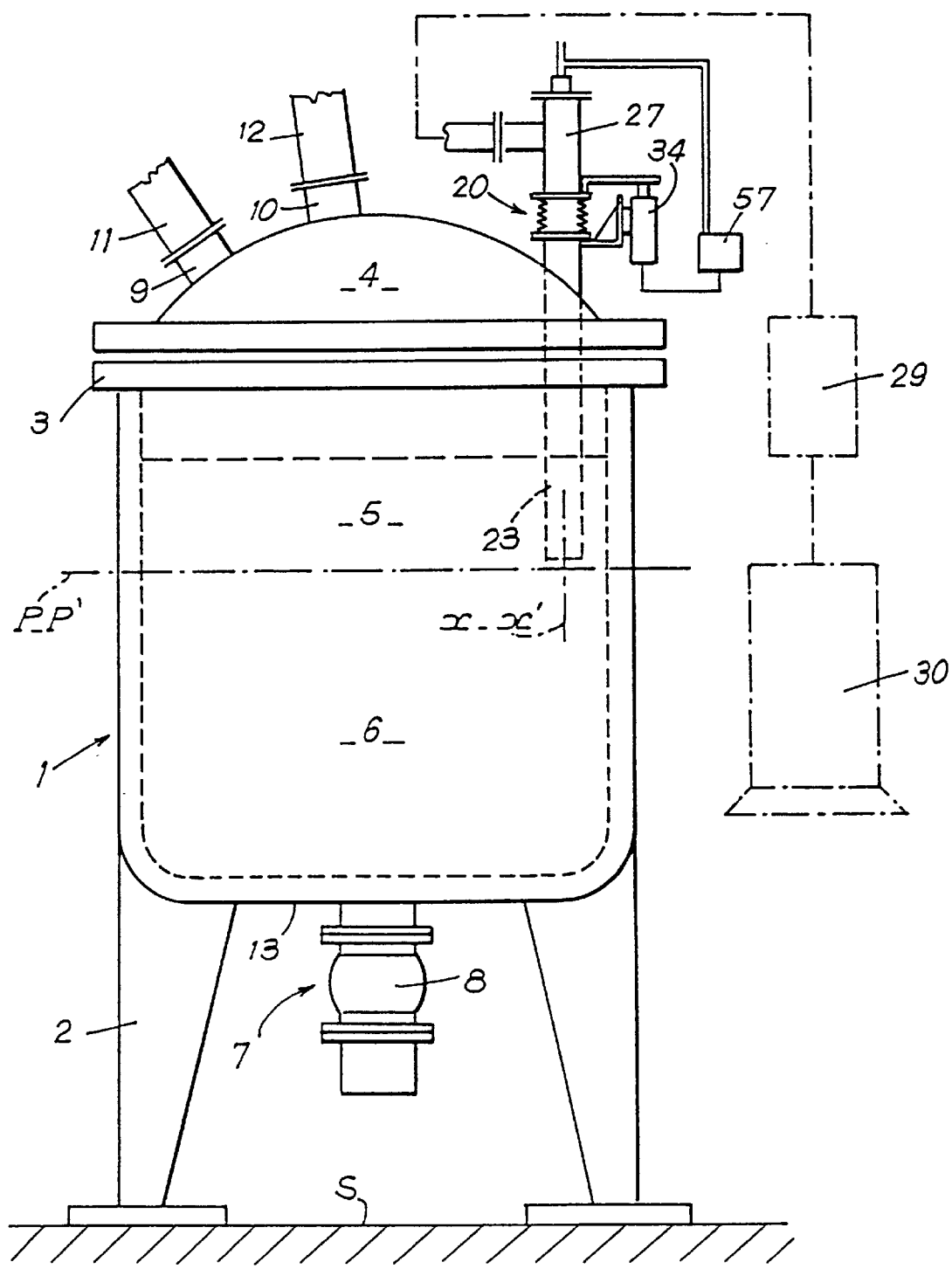
FIG. 1 is a schematic view of a reactor equipped with the means for implementing the object of the invention.

FIG. 1 schematically shows a reactor 1 constituted by a reservoir of any appropriate shape, fixed with respect to the ground S, possibly borne by a leg system 2 or any other means, and of which the upper edge 3 is adapted to allow assembly and tight fixation of a top, cover or dome 4 intended to isolate the inner medium of the recipient 1 in which, by any appropriate process, a biphase system must be established, composed of a phase 5 of lower density and a phase 6 of higher density.

Within the meaning of the invention, the method of separation is indifferent and may result from an industrial process upstream or from a particular step of treatment within the reactor 1, particularly when this latter is equipped with a stirring device (not shown) and/or with appropriate heating or cooling means, likewise not shown in FIG. 1.

By way of example, it may be considered that the reactor 1 comprises, at its base, a drawing-off well 7 constituted by a tube equipped with a valve 8 and, on the top 4, tubes 9 and 10 provided for example for connection of conduits or pipes 11 and 12 intended to place the reactor 1 in relation with an installation upstream and/or downstream or with feeders or buffer-reservoirs for distributing products having to be mixed in the reactor 1.

The means of the invention for removing the phase 5, after a step of separation and stabilization relatively to the medium 6, are intended to take into account, blind inside the closed recipient 1, the height, with respect to a reference which may be the ground S or the bottom 13 of the recipient, of the plane P–P' passing through the level or interface of separation between phases 5 and 6.

Figure 2:
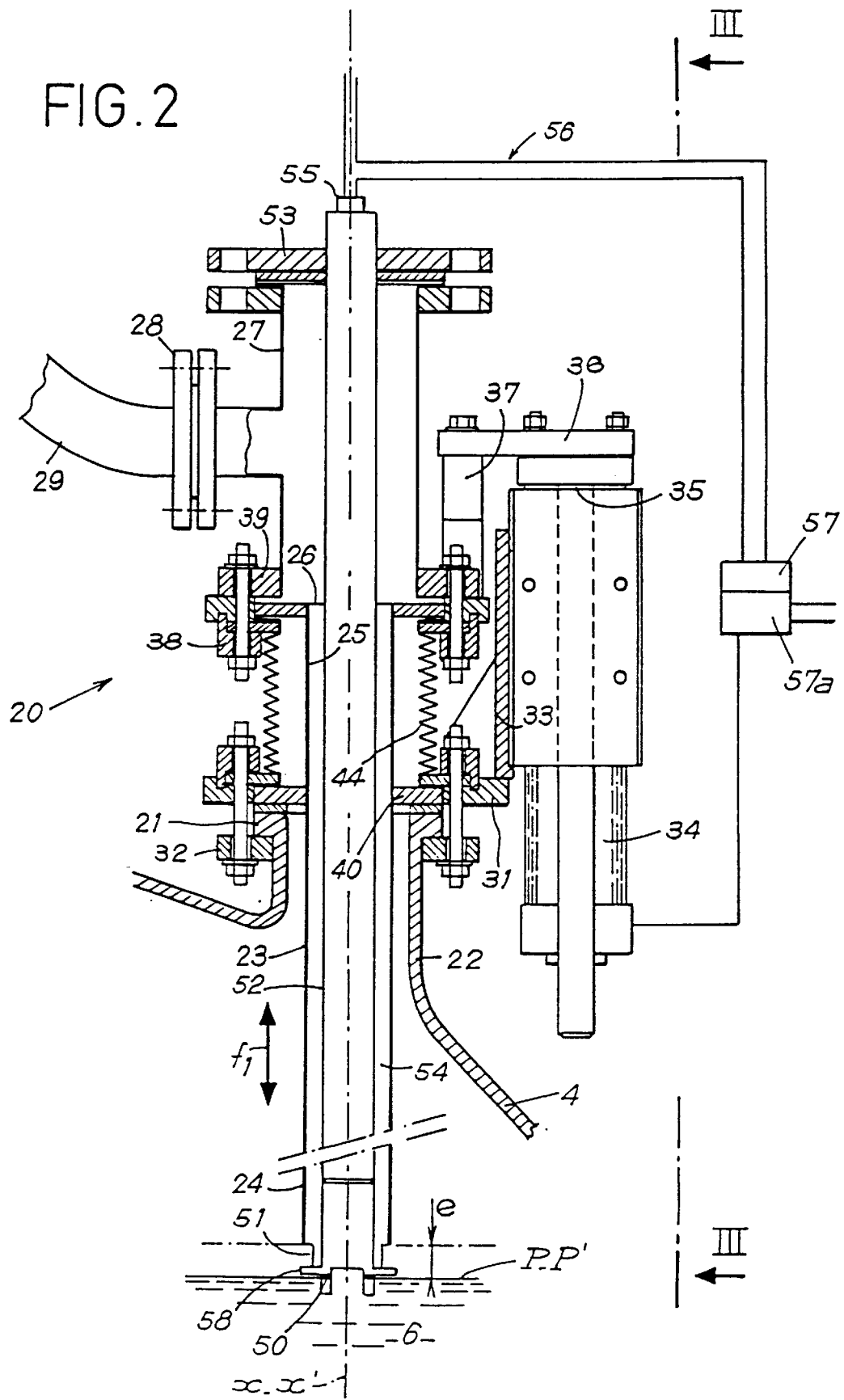
FIG. 2 is a transverse section, in front view, showing, on a larger scale, details of embodiment of the means of the invention.

The means according to the invention comprise, according to FIGS. 1 and 2, a removal head 20 which is mounted on a flange 21 formed by a tube 22 belonging to the top 4 of the reactor 1. Generally, and preferably, the axis of the tube 22 is vertical and the plane of the flange 21 is orthogonal to this axis.

The head 20 comprises an immersion tube 23 of which the lower terminal part 24 plunges in the reactor 1, while the upper terminal part 25 is provided with a neck bearing 26 serving as base for the tight fixation of a T-connector 27. The connector 27 comprises, in known manner, a flange 28 on which is connected the line of a suction unit 29 adapted to ensure filling of a removable storage reservoir 30.

According to the invention, it is provided to interpose between the top 4 and the head 20, means for guiding and moving the tube 23 with respect to the reactor, in a reciprocal rectilinear path directed parallel to the axis x–x' of the tube. These guiding and moving means comprise, in order to perform the function of motorization, a base 31 which is fixed, via a flange 32, on the flange 21 with interposition of sealing means adapted to the nature of the products included in the composition of the biphase system occupying the volume of the reactor 1. The base 31 is intended to be traversed by the tube 23 and comprises, outside the latter, a console or bracket 33 reserved for mounting an energy transformer 34, for example a jack with reciprocal rectilinear stroke parallel to the axis x–x'. The jack 34 may be a single- or double-effect jack, hydraulic or pneumatic, or a mechanical or electric jack.

The mobile member 35 of the jack 34 is connected to a take-up plate 36 which is fast with small columns 37 borne or fixed on the neck bearing 26. The small columns 37 are fast with a sole 38 which is connected to the neck bearing 26 via a flange 39 likewise ensuring connection on the neck bearing 26 of the connection 27.

When the energy transformer 34 is functioning, the means described hereinabove subject the immersion tube 23 to a reciprocal rectilinear displacement in one or other of the directions of arrow $f_1$.

The means according to the invention for guiding the immersion tube 23 in reciprocal rectilinear displacement parallel to axis x–x', further comprise a ring 40 which is fixed on the flange 21 by the flange 32. Ring 40 is intended to centre and guide the immersion tube 23 passing therethrough.

Figure 3:
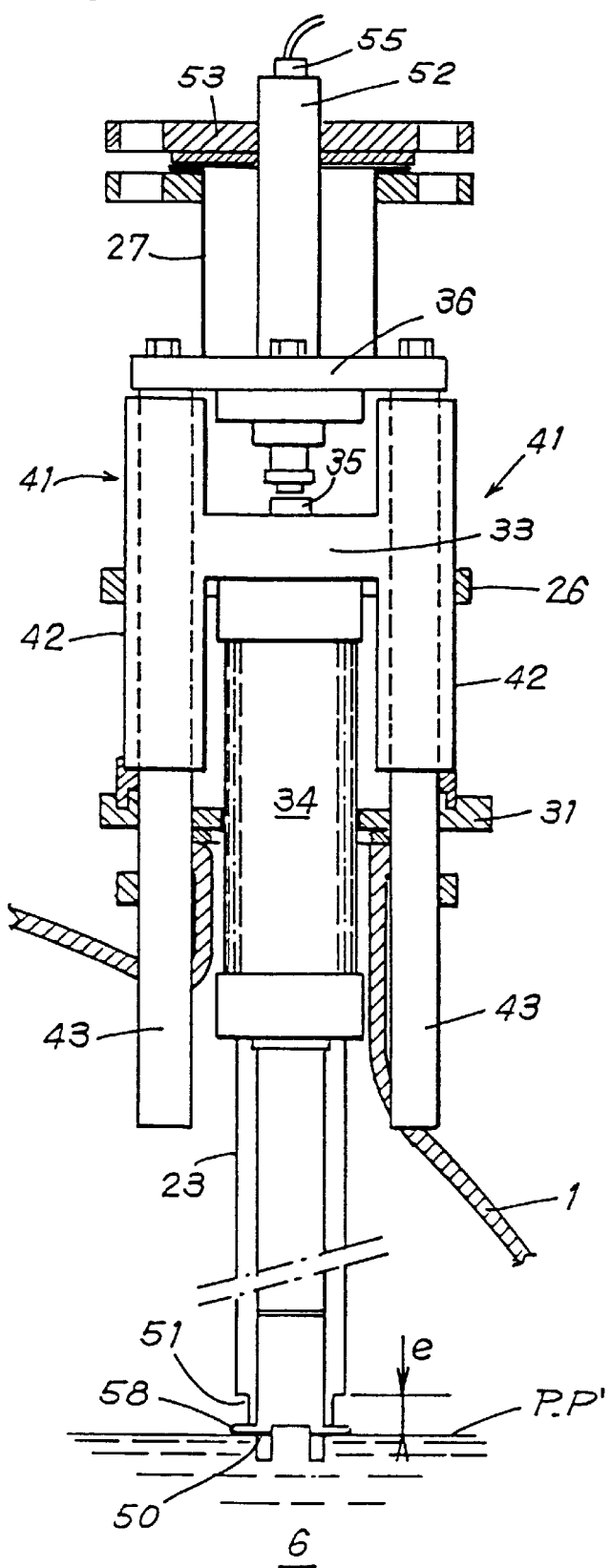
FIG. 3 is a side view taken along line III-III of FIG. 2.

The guiding means further comprise two slideways 41 (FIG. 3) each comprising a slide 42 which is formed, parallel to axis x–x', by the bracket 33. Each slide 42 is adapted to cooperate permanently with a guiding column 43 extending vertically from the take-up plate 36.

Protective bellows 44 are arranged to surround the immersion tube 23 concentrically, being fixed by its respective ends on the flanges 32 and 39. Such bellows may be made of a number of different materials, for example polytetrafluoroethylene. The bellows 44 ensure tightness of the removal head 20, but equivalent technical means may also be used.

According to another arrangement of the invention, the tube is equipped with a level sensor or detector 50 which is disposed just below the plane of the suction port 51 of the tube 23. The sensor or detector 50 is chosen to be able to detect the plane P–P' of separation of the phases 5 and 6 and, to that end, a number of technical solutions may be retained. It is possible to use as sensor or detector, a conductivimeter, a densimeter or a viscosimeter, or an optical detector. Such sensors or detectors are marketed by numerous firms and thus form part of the known art. They do not form a direct part of the object of the invention.

According to one arrangement of the invention, it is provided to place the sensor or detector 50 at a distance e from the port 51. According to one embodiment, the sensor or detector 50 is disposed at the end of a pipe 52 extending inside the tube 23 and concentrically thereto, being suspended from the connection 27 via a plate 53. The pipe 52 presents a diameter chosen to leave inside the tube 23 an annular space 54 which is compatible with the viscosity of the phase 5 and the suction conditions maintained by the unit 29.

Pipe 52 comprises outside the plate 53 a connector 55 connected by a line 56 to the data-processing means 57 which, in a simple example of application, may be any indicator means enabling the operation of the sensor or detector 50 to be assessed.

Furthermore, the sensor 50 is also disposed beneath a plate 58 which is placed in the lower plane of the port 51.

The means described hereinabove are carried out to proceed with removal of the phase of lowest density, as follows:

After stabilization of the plane of separation P–P', the immersion tube 23 is displaced downwardly via the transformer 34 up to the moment when the sensor or detector 50 encounters the plane P–P' and enters into the state of detection of the upper level of phase 6.

In this state, the data transmitted from the sensor or detector 50 via line 56 ensures functioning of the means 57 informing the operator of the detection of level P–P'.

The data transmitted from sensor 50 may advantageously be used to servo-control a unit 57a whose task is to pilot the means for controlling or supplying the energy transformer 34.

The act of stopping operation of the transformer 34 maintains the immersion tube in a stable condition of penetration in which, as shown in FIG. 2, the sensor 50 is placed substantially in the plane P–P' while the suction port of the tube 23 is located in an upper plane distant by a measurement e with respect to plane P–P'.

Removal of phase 5 may then be initiated by controlling operation of unit 29 until the residual quantity of phase 5 attains a height with respect to plane P–P' which is less than the level of distance e.

In such a situation, the means 29 undergo a phase of deenergizing, informing the operator that the maximum quantity of phase 5 has been removed.

Under the conditions of removal and stability prevailing inside the reactor 1, the space e may be reduced to a relatively small layer thickness thus procuring the guarantee of removing the optimum quantity possible and available of the compound 5 from the closed reactor 1.

A minimum loss of compound 5 is thus guaranteed, as well as an absence of risk of pollution of the line of extraction of a fraction of the medium 6.

This guarantee is given by the plate 58 which prevents the upper layer of the phase 6 from attaining the lower plane of the port 51.

According to an arrangement of the invention, it may be envisaged to adapt at the end of the pipe 52 a sensor 50 capable of detecting the interface either upon descent or rise of the immersion tube 23.

In such a case, the signal furnished by sensor 50 is of the same nature but of different direction depending on the upper or lower level of detection and in that case makes it possible to pilot either upon descent or on rising, the displacement of the immersion tube 23 via the unit 57$a$ in order still to servo-control the position of the port 51 in a state of distance e with respect to the plane P–P', whatever the variation of the latter, for example as a function of the conditions of development of an industrial process upstream, supplying in the reactor a biphase system composed of phases 5 and 6.

INDUSTRIAL APPLICATION

By way of industrial application, the means of the invention may be employed for recovering toluene from a mixture of toluene/chloroethanol, by washing the toluene in water to extract the chloroethanol. In such an application, the aqueous layer: water/chloroethanol constitutes phase 5 and the organic layer: toluene, phase 6, and the process carried out by successive separation consists in recovering phase 6.

The invention is not limited to the examples described and shown, as various modifications may be made thereto without departing from its scope.

We claim:

1. Method for removal within a closed reservoir of a phase of lowest density from a biphase system contained in the reservoir and having an interface, said method comprising:

immersing a tube in the reservoir within a volume occupied by a phase to be removed from above the reservoir and removing said phase by suction means until a plane of phase separation is close to a plane of a suction port of the tube, said immersing and removing steps including:

arranging, beneath and at a distance from the plane of the suction port of the tube, a detector for detecting a level of the interface in the biphase system between two phases of different density, so as to determine the phase of highest density, displacing the tube and the detector via guiding and motorization means in a reciprocal, rectilinear path parallel to the axis of the tube until said interface is detected by the detector, and sucking the phase of lowest density until the suction means are deenergized.

2. Method according to claim 1, wherein the functioning of the motorization means is servo-controlled in relation with the fluctuations of the level of the interface detected by the sensor.

3. Method according to claim 1, wherein said displacing step includes moving the detector and the tube toward the interface in order for the detector to detect the same.

4. Removal device for removing, within a closed reservoir, a phase of lowest density from a biphase system contained in the reservoir, said device comprising:

a suction head adapted for use on a top of the reservoir and connected to a suction means and an immersion tube descending in the reservoir and presenting at its lower end a suction port, a sensor for sensing a level of a phase of highest density, arranged beneath and at a distance from a plane of the suction port and connected to a data processing means located outside the reservoir, and means for guiding and moving the tube and the sensor with respect to the reservoir, in a reciprocal, rectilinear path parallel to the axis of the tube.

5. Removal device according to claim 4, wherein the sensor is adapted to detect a phase interface upon descent and/or rise of the tube.

6. Removal device according to claim 4, wherein:

the guiding and moving means comprise a centering ring mounted on the reservoir and traversed by the tube, guiding slideways having elements which are interposed between the reservoir and the tube, and a motorization means comprising an energy transformer interposed between the elements of the slideways.

7. Removal device according to claim 6, wherein the elements of the slideways include fixed elements and mobile elements and the energy transformer includes a mobile member, and the guiding and moving means further comprise:

a base mounted on the reservoir, supporting the ring and bearing a console on which are arranged the fixed elements of the slideways and the energy transformer, and a take-up plate mounted on the tube, bearing the mobile elements of the slideways and connected to the mobile member of the energy transformer.

8. Removal device according to claim 7, wherein the plate is borne by an upper neck bearing of the tube having a suction connection from which is suspended a pipe disposed concentrically inside the tube and provided at its lower end with the sensor.

9. Removal device according to claim 8, wherein the neck bearing supports sealing bellows, a bottom of which is connected to the base.

10. Removal device according to claim 4, wherein the data processing means comprises a unit piloted by the sensor and servo-controlling a motorization means.

11. Removal device according to claim 4, wherein said means for guiding and moving includes means for moving the sensor toward the interface in order to sense the same.

* * * * *